US011342547B2

(12) United States Patent
Wang et al.

(10) Patent No.: US 11,342,547 B2
(45) Date of Patent: May 24, 2022

(54) POSITIVE ELECTRODE, METHOD FOR PREPARING THE SAME AND ELECTROCHEMICAL DEVICE

(71) Applicant: CONTEMPORARY AMPEREX TECHNOLOGY CO., LIMITED, Ningde (CN)

(72) Inventors: Shiwen Wang, Ningde (CN); Qisen Huang, Ningde (CN); Huafeng Huang, Ningde (CN); Chengdu Liang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 122 days.

(21) Appl. No.: 16/235,625

(22) Filed: Dec. 28, 2018

(65) Prior Publication Data
US 2019/0207202 A1    Jul. 4, 2019

(30) Foreign Application Priority Data

Dec. 29, 2017    (CN) .......................... 201711478741.0

(51) Int. Cl.
*H01M 4/00* (2006.01)
*H01M 4/131* (2010.01)
(Continued)

(52) U.S. Cl.
CPC ......... *H01M 4/131* (2013.01); *H01M 4/0421* (2013.01); *H01M 4/0423* (2013.01);
(Continued)

(58) Field of Classification Search
CPC .. H01M 4/131; H01M 4/5825; H01M 4/1397; H01M 4/0428; H01M 2/1673;
(Continued)

(56) References Cited

U.S. PATENT DOCUMENTS 9,570,734 B2 †    2/2017    Kelder
2009/0087731 A1    4/2009    Fukui et al.
(Continued)

FOREIGN PATENT DOCUMENTS

CN    101911368 A    12/2010
CN    103794794 A    5/2014

OTHER PUBLICATIONS

Methekar, Ravi N., et al. "Optimal spatial distribution of microstructure in porous electrodes for Li-ion batteries." Proceedings of the 2010 American Control Conference. IEEE, 2010. (Year: 2010).*
(Continued)

*Primary Examiner* — Nicholas P D'Aniello
(74) *Attorney, Agent, or Firm* — Tucker Ellis LLP

(57) ABSTRACT

The present disclosure relates to the technical field of energy storage, and in particular, relates to a positive electrode, a method for preparing the positive electrode and an electrochemical device. The positive electrode includes a current collector and a positive electrode active material layer that contains positive electrode active material and is arranged on at least one surface of the current collector. An inorganic layer having a thickness of 20 nm to 2000 nm is arranged on the surface of the at least one positive electrode active material layer away from the current collector. The inorganic layer is a porous dielectric layer containing no binder, and the inorganic layer has a porosity of 10%~60%. The positive electrode active material layer according to the present disclosure significantly improves the cycle performance, high-temperature storage performance and safety of the electrochemical device.

14 Claims, 2 Drawing Sheets

(51) Int. Cl.
*H01M 4/04* (2006.01)
*H01M 4/1391* (2010.01)
*H01M 4/505* (2010.01)
*H01M 4/525* (2010.01)
*H01M 4/58* (2010.01)
*H01M 4/1397* (2010.01)
*H01M 4/136* (2010.01)
*H01M 50/46* (2021.01)
*H01M 10/0525* (2010.01)
*H01M 4/02* (2006.01)
*H01M 10/052* (2010.01)

(52) U.S. Cl.
CPC ......... *H01M 4/0428* (2013.01); *H01M 4/136* (2013.01); *H01M 4/1391* (2013.01); *H01M 4/1397* (2013.01); *H01M 4/505* (2013.01); *H01M 4/525* (2013.01); *H01M 4/5825* (2013.01); *H01M 10/0525* (2013.01); *H01M 50/46* (2021.01); *H01M 4/0426* (2013.01); *H01M 10/052* (2013.01); *H01M 2004/021* (2013.01); *H01M 2004/028* (2013.01)

(58) Field of Classification Search
CPC ............... H01M 4/0423; H01M 4/136; H01M 10/0525; H01M 4/0421; H01M 4/1391; H01M 4/505; H01M 4/525; H01M 4/0426; H01M 10/052; H01M 2004/028; H01M 2004/021; H01M 4/628; Y02E 60/10
See application file for complete search history.

(56) References Cited

U.S. PATENT DOCUMENTS

2010/0330410 A1* 12/2010 Takahashi ............... H01M 4/62
429/129
2011/0294006 A1† 12/2011 Amine
2011/0311882 A1† 12/2011 Kim
2012/0100440 A1  4/2012 Narula et al.
2016/0351973 A1† 12/2016 Albano
2017/0338475 A1  11/2017 Laramie et al.

OTHER PUBLICATIONS

European Search Report dated Jan. 8, 2019 in European Application No. 18204687.0.
First Chinese Office Action from corresponding Chinese Application No. 201711478741.0, dated Mar. 22, 2021, 7 pages.
Second Chinese Office Action from corresponding Chinese Application No. 201711478741.0, dated Jun. 10, 2021, 8 pages.
Extended European Search Report for counterpart European Application 18204687.0 (EP Publication No. 3506397), dated Jan. 8, 2019.†

* cited by examiner
† cited by third party

POSITIVE ELECTRODE, METHOD FOR PREPARING THE SAME AND ELECTROCHEMICAL DEVICE

CROSS-REFERENCE TO RELATED APPLICATIONS

The present application claims priority to Chinese Patent Application No. CN201711478741.0, filed on Dec. 29, 2017, the content of which is incorporated herein by reference in its entirety.

TECHNICAL FIELD

The present disclosure relates to the technical field of energy storage, and in particular, relates to a positive electrode, a method for preparing the positive electrode and an electrochemical device.

BACKGROUND

Lithium-ion batteries have become the main energy source for various consumer electronics, power products, and energy storages and are applied in various aspects of daily life, because they have characters of high working voltage, high energy density, no memory effect, environmental protection and the like. In recent years, the market, especially the power battery market, raises higher requirements on the battery energy density and charging efficiency. With regards to the secondary battery, improvement in the battery energy density is mainly achieved in two manners: i) increasing a cut-off charge voltage of the battery, and ii) increasing capacity of positive electrode active material. However, under an excessively high charge-discharge voltage, lithium-ions may de-intercalate excessively in most of the positive electrode active material, and its crystal structure is likely to change or even collapse. Under a high voltage, organic solvents and additives in the electrolyte tend to decompose due to their insufficient chemical stability. Particularly, when the lithium transition metal oxide contains strong oxidizing nickel ions, it is likely to cause side reactions in the electrolyte, resulting in a serious gas production problem, which further leads to a decrease in the battery capacity, a deterioration of cycle performance and severe degradation of high-temperature storage performance. These not only cause irreversible damage to the battery life, but also lead to potential safety hazards.

On the other hand, the increase in capacity of the positive active material is usually achieved by the use of lithium transition metal oxides with a higher theoretical capacity per gram and an increase in compaction density. However, with the increasing of the compaction density of the positive electrode, the electrode porosity decreases, ability of absorbing the electrolyte of the electrode is weakened, ion conductivity of the electrode degrades, thereby resulting in a higher overall resistance of the battery and a deterioration of the cycle performance of the battery.

Currently, in order to solve the above problems, positive active material particles are coated and modified to stabilize the crystal structure of the particles and avoid electrolyte side reactions on the surface of the particles. However, several problems and difficulties exist in the method, including uneven coating, coating shedding, particle agglomeration, and complex coating processes. In addition, since most of the coating substance of the particles is chemically inert inorganic material, the electrical conductivity of the active material particles in the electrode is poor, the DCR of the battery is relatively high, and electrolyte-retaining rate is not obviously improved.

SUMMARY

A first aspect of the present disclosure provides a positive electrode. The electrode includes a current collector, and a positive electrode active material layer that is arranged on at least one surface of the current collector and contains positive electrode active material. The electrode further includes an inorganic layer. The inorganic layer has a thickness of 20 nm to 2000 nm and is arranged on a surface of the at least one positive electrode active material layer away from the current collector. The inorganic layer is a porous dielectric layer containing no binder, and the inorganic layer has a porosity of 10%~60%.

A second aspect of the present disclosure provides a method for preparing the positive electrode according to the first aspect. The method includes at least following steps: preparing a slurry by mixing a positive electrode active material, a binder and a conductive agent; coating on at least one surface of a current collector with the slurry and drying the slurry to form a positive electrode active material layer; and preparing an inorganic layer having a thickness of 20 nm to 2000 nm on a surface of the at least one positive electrode active material layer away from the current collector by vapor deposition method. The inorganic layer is a porous dielectric layer containing no binder, and the inorganic layer has a porosity of 10%~60%.

A third aspect of the present disclosure provides an electrochemical device including the above positive electrode.

The technical solutions of the present disclosure have at least the following beneficial effects.

In the present disclosure, the inorganic layer provided on the surface of the positive electrode active material layer has high ion transmission rate, good mechanical properties and good chemical stability, and is stable even under a high voltage. By adopting the positive electrode provided with such inorganic layer, on the one hand, the surface resistance of the positive electrode can be increased, thereby effectively avoiding short circuit caused by direct contact between the positive and negative electrodes under the extreme situation or abuse, thus improving the safety performance of the battery; on the other hand, the above inorganic layer can slow down surface structure change on active material surface of the positive active material at high voltage, thereby improving the stability and long-term reliability of the positive electrode material, and improving the capacity retention rate after cycles of the battery. Further, the inorganic layer can stabilize the contact interface between the positive electrode active material and the electrolyte, and inhibit the occurrence of side reactions of the electrolyte on the surface of the active material, thereby effectively improving the problem of gas production during the storage of the battery. At the same time, in order to meet the high-capacity requirement, generally, the compaction density of the ternary NCM positive electrode is not lower than 3.4 $g/cm^3$, and the compaction density of the positive electrode of lithium iron phosphate type is not lower than 2.2 $g/cm^3$, and high compaction density leads to a poor electrolyte wettability and a low electrolyte retaining rate of the electrode. By providing the hydrophilic inorganic layer on the surface of the electrode, the wettability, the number of channels for ion transmission and electrolyte retaining rate of the electrode are all increased, thereby guaranteeing a high ion passing rate between the electrode and the electrolyte.

REFERENCE SIGNS

1—current collector;
2—positive electrode active material layer;
3—inorganic layer.

DESCRIPTION OF EMBODIMENTS

The present disclosure is further described below by means of Embodiments and Comparative Examples. These Embodiments are merely used for illustrating the present disclosure, but not intended to limit the present disclosure. Without departing from the scope of the technical solutions of the present disclosure, any modification or equivalent substitution of the technical solutions of the present disclosure shall fall within the protection scope of the present disclosure.

The present disclosure aims to provide a positive electrode, a method for preparing the positive electrode and a lithium-ion battery adopting the positive electrode.

A positive electrode according to a first aspect of embodiments of the present disclosure is firstly described as below.

The positive electrode according to the first aspect includes a current collector and at least one positive electrode active material layer containing positive electrode active material and arranged on at least one surface of the current collector. There may be a positive electrode active material layer provided on one surface of the current collector, or there may be positive electrode active material layers provided on two opposite surfaces of the current collector.

Figure 1:
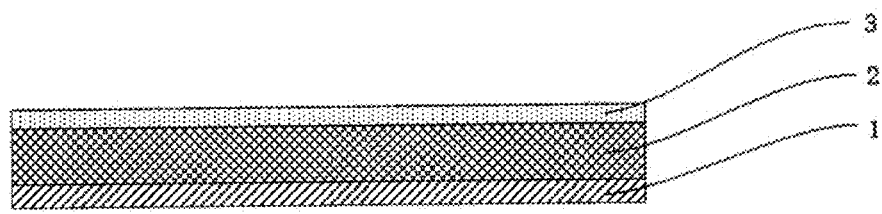
FIG. 1 is a structural schematic diagram of a positive electrode according to an embodiment of the present disclosure.
Figure 2:
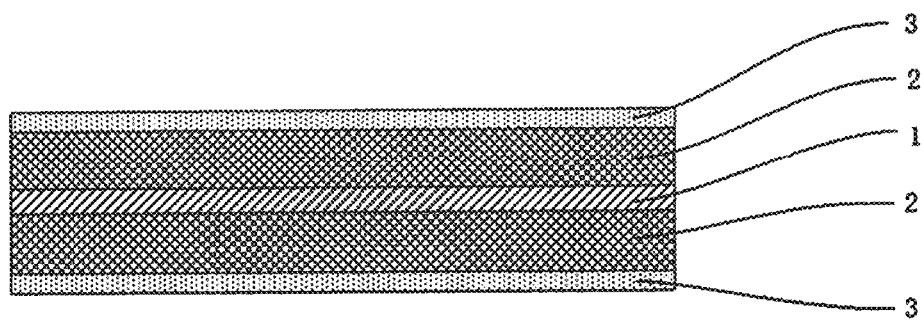
FIG. 2 is a structural schematic diagram of another positive electrode according to an embodiment of the present disclosure.
Figure 3:
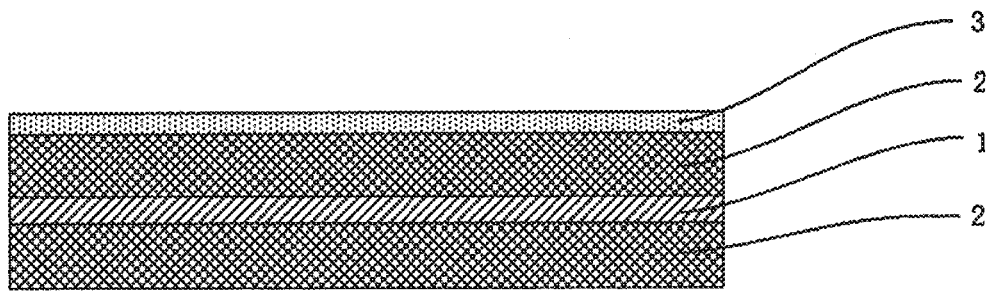
FIG. 3 is a structural schematic diagram of another positive electrode according to an embodiment of the present disclosure.

FIGS. 1 to 3 illustrate structural schematic diagrams of positive electrode according to the embodiments of the present disclosure. As shown in FIG. 1, a positive electrode active material layer 2 is provided on a surface of the current collector 1, and an inorganic layer 3 is provided on a surface of the positive electrode active material layer 2. As shown in FIGS. 2 and 3, two positive electrode active material layers 2 are provided on two surfaces of the current collector 1. In the positive electrode shown in FIG. 2, two inorganic layers 3 are provided on the surface of each positive electrode active material layer 2 away from the current collector 1. In the positive electrode shown in FIG. 3, an inorganic layer 3 is provided on a surface of one of the two positive electrode active material layers 2.

Figure 4:
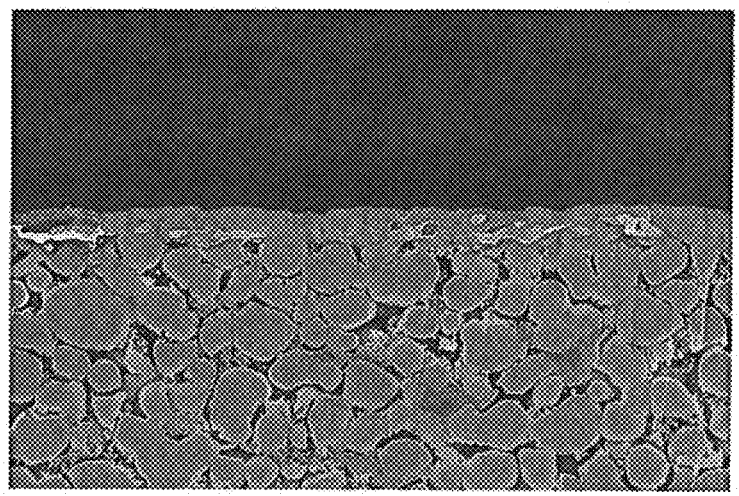
FIG. 4 is a SEM photograph (3000×) of a cross-section of a positive electrode according to an embodiment of the present disclosure.

FIG. 4 shows a scanning electron microscope (SEM) photograph at a magnification of 3000 times of a cross-section of a positive electrode according to an embodiment of the present disclosure. As shown in FIG. 4, an inorganic layer having a certain thickness is provided on the surface of the positive electrode. Pores of the inorganic layer cannot be clearly distinguished in the photograph due to their pore diameter of smaller than 100 nm.

When a cut-off charge voltage of the positive electrode active material is higher than a normal working voltage of the positive electrode material, the crystal structure of the positive electrode active material is likely to undergo a structural phase transition, and side reactions of the electrolyte are likely to occur at the surface of the positive electrode active material. In this way, the electrochemical device may produce a large amount of gas, which further results in the deterioration of the cycle performance, battery life and safety performance. In view of this, in an embodiment of the present disclosure, an inorganic layer having a thickness of 20 nm to 2000 nm is provided on the surface of at least one positive electrode active material layer away from the current collector, and the inorganic layer is an inorganic dielectric layer having a porous structure. In this way, without affecting the energy density of the battery, an ultrathin and porous interface, which is ion permeable and has stable chemical properties, is formed between the positive electrode active material and the electrolyte, thereby enhancing the stability and long-term reliability of the positive electrode active material. Further, structural change of the positive electrode active material as well as the side reactions occurring between the electrolyte and the surface of the positive electrode active material can be avoided in the positive electrode under conditions of high voltage, high temperature and fast charging, thereby improving the cycle life under a high voltage and inhibiting the gas production from electrolyte decomposition.

In the embodiments of the present disclosure, the inorganic layer contains no binder. Thus, the inorganic layer is not connected to the positive electrode active material by binder, thereby avoiding the deterioration of the electrical properties and safety problems caused by the peeling of the inorganic layer in case of non-uniform distribution of the binder, binder failure due to the immersing in the electrolyte, long-term cycle or mechanical abuse. In the meantime, the positive electrode active material layer has a smooth surface after a cold pressing, so that the inorganic layer also has a good uniformity on the surface of the positive electrode active material layer, and the thickness deviation can be controlled to be within ±5%.

The inorganic layer has a porosity of 10%~60%. An upper limit of the porosity of the inorganic layer is 60%, 55%, 50%, 45%, 40%, or 35%. A lower limit of the porosity of the inorganic layer is 10%, 12%, 15%, 18%, 20%, 22%, 25%, or 30%. The porosity of the inorganic layer can be in any range consisting of any value of the above upper limits and any value of the above lower limits. If the porosity of the inorganic layer is lower than 10%, even the surface of the electrode has a good wettability, a number of channels on the surface of the electrode that are permeable for the electrolyte and absorbing amount of the channels are both too little, so that the ion-transmission performance and dynamic performance of the battery are relatively poor. If the porosity of the inorganic layer is higher than 60%, contact area between the electrolyte and the positive electrode active material is too large, so that the effect of suppressing the side reactions of the electrolyte is unobvious, and the structure of the inorganic layer is too loose to have good mechanical properties, thereby affecting the long-term reliability of the battery.

A method for measuring the porosity of the inorganic layer is performed as follows: the positive electrode (only including the current collector and the positive electrode active material layer provided on the surface of the current collector) is cut out into two electrode samples with the same area, one of which is untreated and the other one of which is prepared with an inorganic layer; the two samples mentioned above are respectively dried in a vacuum oven at 105° C. for 2 h, and then placed in a desiccator for cooling down and then for measuring; the samples are wrapped with A4 papers and flattened on a die, and punched with a punching machine, so as to make the samples to be ready for measuring; the thickness of each sample is firstly measured by a micrometer to calculate an apparent volume of each sample based on a surface area and the thickness of each sample, and the apparent volume of the untreated electrode sample and the apparent volume of the electrode sample prepared with the inorganic layer are respectively denoted as V1 and V2; then the real volume of each sample is measured by an AccuPyc II densitometer, and the real volume of the untreated electrode sample and the real volume of the electrode sample prepared with the inorganic layer are respectively denoted as V3 and V4. It can be conducted that the porosity of the inorganic layer is equal to [V2−V4−(V1−V3)]/(V2−V1)×100%.

In other embodiments, the porosity of the inorganic layer is 20% to 50%, preferably 25% to 40%.

As an improvement of the positive electrode according to the embodiment of the present disclosure, the thickness of the inorganic layer is in a range of 50 nm to 1500 nm. An upper limit of the thickness of the inorganic layer can be 1500 nm, 1400 nm, 1300 nm, 1200 nm, 1100 nm, 1000 nm, 990 nm, 950 nm, 900 nm, 850 nm, 800 nm, 750 nm, 720 nm, 700 nm, 680 nm, 650 nm, 600 nm, 550 nm, or 500 nm. A lower limit of the thickness of the inorganic layer can be 50 nm, 55 nm, 60 nm, 70 nm, 80 nm, 90 nm, 100 nm, 110 nm, 150 nm, 200 nm, 250 nm, 280 nm, 300 nm, 350 nm, 380 nm, 400 nm, 430 nm, 450 nm, or 490 nm. The thickness of the inorganic layer can be in any range consisting of any value of the above upper limits and any value of the above lower limits. If the inorganic layer is too thin, the interface between the positive electrode active material layer and the electrolyte cannot be effectively stabilized. If the inorganic layer is too thick, it will have a certain adverse effect on the ion-permeability of the electrode, thereby further adversely affecting the cycle and dynamic performances of the battery adopting this electrode, also increasing the thickness of the electrode and reducing the energy density of the battery.

In other embodiments, the thickness of the inorganic layer is preferably in a range of 100 nm to 1000 nm, and more preferably 150 nm to 500 nm. Within the above ranges, not only the wettability of the electrode with the electrolyte and the electrolyte-retaining rate and ion-permeability of the electrode can be improved, but also the thickness and mass of the electrode can only have a small increase, which can facilitate an increase in the energy density of the battery.

As an improvement of the embodiments of the present disclosure, the inorganic layer is manufactured by using vapor deposition method. Since the inorganic layer manufactured by vapor deposition method has a stable structure, properties and good uniformity, the thickness deviation can be controlled to be within ±5%. In addition, molecules of the inorganic layer are bonded to the positive electrode active material layer by chemical bonds, so that the inorganic layer is strongly bonded to the positive electrode active material layer and unlikely to be peeled off. By using vapor deposition method, the thickness of the inorganic layer can be reduced to a certain extent, and the bonding force between the inorganic layer and the positive electrode active material layer can be increased.

Preferably, the vapor deposition method includes Atomic Layer Deposition (ALD), Chemical Vapor Deposition (CVD), Physical Vapor Deposition (PVD) and Thermal Evaporation Deposition. Preferably, plasma assisted thermal evaporation deposition, reactive ion beam sputtering deposition, electron beam evaporation, magnetron sputtering method, or plasma arc plating can be used.

As an improvement of the embodiment of the present disclosure, the inorganic layer spreads on the surface of the positive electrode active material layer away from the current collector and inner walls of pores on the surface of the positive electrode active material layer. Since the inorganic layer according to the embodiments of the present disclosure is relatively thin, the inorganic layer, when manufactured by using vapor deposition method, not only can be deposited on the surface of the positive electrode active material layer, but also can penetrate in the electrode and be deposited on the inner walls between the active material particles to a certain depth from the surface of the electrode active material layer. With an increase of the thickness of the inorganic layer, the coverage rate of the pores between particles in the electrode active material layer is increased, the effect of suppressing the side reactions of the electrolyte on the surface of the particles is more outstanding, and the resistivity of the surface of the electrode active material layer is also increased, thereby effectively solving the problems of gas production and safety in the battery.

As an improvement of the embodiment of the present disclosure, preferably, a ratio of the depth of the inorganic layer spreading in the pores on the surface of the positive electrode active material layer to the thickness of the positive electrode active material layer is in a range of $1/1000$ to $1/10$. In a specific preparing process, for example, when using vapor deposition method, the coating depth of the inorganic layer inside the positive electrode active material layer increases with a deposition thickness. However, if the coating depth is too deep, for example, greater than $1/10$ of the thickness of the positive electrode active material layer, the pores of the positive electrode active material layer can be blocked by a large amount of the inorganic layer, resulting in a deterioration of the ion transmission performance of the battery. If the inorganic layer coats the inner walls of the pores to a shallow depth, for example smaller than $1/1000$ of the thickness of the positive electrode active material layer, a large area of the surfaces of active material particles inside the positive electrode active material layer are exposed, such that the effect of stabilizing the interface by the inorganic layer is not obvious under a voltage above the normal working voltage.

As an improvement of the embodiment of the present disclosure, the inorganic layer has a porous structure formed by stacked nanoclusters. The nanoclusters are ultrafine particles in nanometer scale. The ultrafine particles in nanometer scale can be formed by agglomerating several to hundreds of atoms and molecules, and these ultrafine particles are referred to as nanoclusters. Pores between the nanoclusters are used for ion transmission. The pores can have an average pore diameter in a range of 0.1 nm to 100 nm. If the average pore diameter is too small, the ion transmission performance of the electrode may be affected, thereby resulting in a poor dynamic performance of the battery adopting the electrode. If the average pore diameter is too large, in order to guarantee the above mentioned porosity, the structure of the inorganic layer may be too loose, the contact area between the electrolyte and the positive electrode active material is too large, and the effect of suppressing the side reactions of the electrolyte is not obvious. Moreover, since the structure of the inorganic layer is likely to be too loose, the mechanical properties of the inorganic layer may be poor, and the reliability of the battering during a long-term use may be reduced.

As an improvement of the embodiments of the present disclosure, the nanoclusters are nanograins of an inorganic dielectric material having an average particle size of 2 nm to 500 nm. If the average particle size of the nanoclusters is too small, the nanoclusters are stacked too tightly to form the inorganic layer having a specific porosity. If the average particle size of the nanoclusters is too large, the nanoclusters are stacked too loose to form the inorganic layer having a specific porosity.

As an improvement of the embodiments of the present disclosure, the inorganic layer has a mass per unit area of 0.03 g/m$^2$-7.0 g/m$^2$. The mass per unit area of the inorganic layer is dependent on parameters such as the distribution of the inorganic layer on the electrode active material layer, and the thickness, porosity and pore diameter of the inorganic layer, and the like. Therefore, merely controlling the thickness of the inorganic layer cannot fundamentally guarantee that the active material on the surface of the positive electrode active material layer can be effectively insulated from the electrolyte. In the present disclosure, it is found that, by controlling the mass of the inorganic layer, the active material on the surface of the positive electrode active material layer can be effectively insulated from the electrolyte, thereby effectively guaranteeing the dynamic performance of the battery. When the mass per unit area of the inorganic layer is too small, the surface of the positive electrode active material layer has a relatively small amount of dielectric material, so that the interface between the electrolyte and the active material particles on the surface of the electrode active material layer cannot be effectively stabilize, and the problems of gas production and poor cycle performance still exist. When the mass per unit area of the inorganic layer is too great, the thickness of the inorganic layer is increased and the inorganic layer may block a large amount of pores on the surface of the electrode active material layer, so that distance of ion transmission is increased, the number of channels for ion transmission is reduced, and intercalation of ions into the positive electrode active material layer and de-intercalation of ions from the positive electrode active material layer are both negatively affected, thereby resulting in the deterioration of the dynamic performance of battery.

The mass per unit area of the inorganic layer is determined by a weight difference method as follows. Before the determination of parameters for preparing the inorganic layer with vapor deposition method, a positive electrode is taken for adjusting equipment parameters. The positive electrode is cut into 20 pieces of 50 mm×50 mm square pieces, and the mass of each piece is accurately weighed using a six-digit precision balance so as to calculate an average weight used as the mass of a copper foil square piece, which is denoted as m0. After the equipment parameters are determined, an inorganic layer is deposited on the positive electrode, and the positive electrode deposited with the inorganic layer is cut into 20 pieces of 50 mm×50 mm square pieces, and the mass of each piece is weighed so as to calculate an average mass, which is denoted as m1. Therefore, the mass per unit area of the inorganic layer is equal to (m1−m0)/25 cm$^2$.

As an improvement of the embodiments of the present disclosure, the porosity of the inorganic layer is greater than the porosity of the positive electrode active material layer. In order to meet the high-capacity requirement of the battery, the compaction density of electrode needs to be further increased, which can result in that the electrode has a low inside porosity and low wettability and electrolyte-retaining rate. By providing on the positive electrode active material layer the inorganic layer having a greater porosity than the porosity of the positive electrode active material layer, the wettability and electrolyte-retaining rate of the electrode can be improved, the dynamic performance can be enhanced, and the electrode active material can be further isolated from contacting with the electrolyte, thereby optimizing the stability of the interface of the battery.

As an improvement of the embodiments of the present disclosure, the inorganic layer contains a material selected from a group consisting of aluminum oxide, AlO(OH), aluminum nitride, aluminum fluoride, silicon oxide, silicon nitride, silicon fluoride, titanium oxide, titanium nitride, titanium fluoride, zinc oxide, zinc nitride, zinc fluoride, magnesium oxide, magnesium nitride, magnesium fluoride, zirconium oxide, zirconium nitride, zirconium fluoride, calcium oxide, calcium nitride, calcium fluoride, barium oxide, barium nitride, barium fluoride, or combinations thereof.

As an improvement of the embodiments of the present disclosure, the positive electrode active material is selected from a group consisting of $Li_zCo_{1-(x+y)}Ni_xMn_yO_2$, $LiCoO_2$, $LiNiO_2$, $LiCo_aNi_{1-a}O_2$, $LiVPO_4$, $Li_2MnO_3$, $LiMn_{2-b}M_bO_4$, $LiFe_cMn_{1-c}PO_4$, or combinations thereof, in which 0<x<1, 0<y<1, 0.9<z<12, 0<a<1, 0≤b<2, 0<c≤1, and M is selected from a group consisting of Li, Al, Mg, Zn, Cr, La, Nd, Ti, Sn, V, or combinations thereof.

As an improvement of the embodiments of the present disclosure, the particles of the positive electrode active material are provided with a coating layer, and the coating layer contains at least one of $Al_2O_3$, CaO, $SiO_2$, $TiO_2$, $B_2O_3$, MgO, $ZrO_2$, or lithium transition metal phosphate. The lithium transition metal phosphate is $Li_{x1}M'_{y1}N'_{1-y1}PO_{4-\lambda}B_\zeta$, in which 0.9≤x1≤1.2, 0.6≤y1≤1.0, 0≤λ≤0.5, 0≤ζ≤0.5, M' is selected from a group consisting of Ni, Co, Mn, or combinations thereof, and N' is selected from a group consisting of Mg, Al, Ti, Ni, Co, Mn, Cu, or combinations thereof.

As an improvement of the embodiments of the present disclosure, the coating layer has a thickness of 5 nm to 500 nm. If the coating layer of the positive electrode active material particles is too thin, the coating layer cannot cover the active material over a wide range and thus fails to provide a protective effect. If the coating layer of the positive electrode active material particles is too thick, the energy density may be negatively affected, the conductivity between the active material particles may be reduced, and the internal resistance and DC resistance (DCR) of the battery may be increased.

A method for preparing a positive electrode according to the second aspect of the present disclosure is described as follows.

The method for preparing a positive electrode according to the second aspect of the present disclosure incudes at least following steps: preparing a slurry by mixing a positive electrode active material, a binder and a conductive agent; coating on at least one surface of a current collector with the slurry and drying the slurry to form a positive electrode active material layer; and preparing an inorganic layer having a thickness of 20 nm to 2000 nm on a surface of the at least one positive electrode active material layer away from the current collector by vapor deposition method. The inorganic layer is a porous dielectric layer containing no binder, and has a porosity of 10%~60%.

In an embodiment, the vapor deposition method includes Atomic Layer Deposition (ALD), Chemical Vapor Deposition (CVD), Physical Vapor Deposition (PVD) and Thermal Evaporation Deposition. Preferably, plasma assisted thermal evaporation deposition, reactive ion beam sputtering deposition, electron beam evaporation, magnetron sputtering method, or plasma arc plating can be used.

Specifically, the inorganic layer can be deposited by means of a thermal evaporation gas phase reaction method, which includes the following steps:

Step (1): evacuating a deposition chamber to a pressure of 0.001 Pa or lower;

Step (2): introducing a reactive gas 'a' into the deposition chamber;

Step (3): heating a precursor 'b' of the porous inorganic layer in a heating chamber into a gaseous precursor, and introducing the gaseous precursor into the deposition chamber; and Step (4): adjusting flow of gas source, substrate temperature, and deposition distance in the deposition chamber, so that the reactive gas 'a' chemically reacts with the gaseous precursor 'b' to form the inorganic layer on the surface of the positive electrode active material layer.

The reactive gas 'a' can be selected from a group consisting of oxygen, ozone, carbon dioxide, water vapor, nitrogen, nitric oxide, nitrogen dioxide, ammonia, or combinations thereof. The precursor 'b' of the inorganic layer can be selected from a group consisting of pure metals, alloys, metal alkyl compounds, metal nitrate compounds, metal acetate compounds, and metal sulfuric acids of Al, Si, Ti, Mg, Zr, Ca, Zn or Ba, or combinations thereof.

The heating current in Step (3) is in a range of 50 A to 300 A.

In Step (4), the substrate temperature is controlled to be lower than 100° C., the volume flow of the reactive gas is 100 sccm-2000 sccm, and plasma can be introduced into the reaction space to increase the activity of the reactive gas.

The electrochemical device according to the third aspect of the present disclosure is described as below.

The electrochemical device of the present disclosure can be a lithium-ion secondary battery, a lithium primary battery, a sodium ion battery, or a magnesium ion battery, but not limited thereto.

The following takes a lithium-ion secondary battery as an example to further discuss the embodiments of the present disclosure.

The lithium-ion secondary battery includes a positive electrode, a negative electrode, a separator, and an electrolyte. The positive electrode is the positive electrode according to the first aspect of the present disclosure.

When the electrochemical device is a lithium-ion secondary battery, the inorganic layer is still stable even the voltage between the positive and negative electrode is above 5 V.

Embodiments and Comparative Examples with respect to the positive electrode, the method for preparing the positive electrode, and the lithium-ion secondary battery are discussed below.

In the embodiments of the present disclosure, the positive electrode active material can be a layered lithium transition metal oxide, lithium-rich manganese-based oxide, lithium iron phosphate, lithium cobaltate, or a positive electrode active material doped or coated with lithium transition metal oxide, lithium-rich manganese-based oxide, lithium iron phosphate, lithium cobaltate. In the embodiments of the present disclosure, $LiNi_{0.8}Co_{0.1}Mn_{0.1}O_2$ (NCM811) is taken as an example of the layered lithium transition metal oxide. The active material of the negative electrode is not specified, and can be selected from a group consisting of natural graphite, artificial graphite, soft carbon, hard carbon, silicon, silicon oxide compound, silicon-carbon composite, lithium, or combinations thereof. In the embodiments of the present disclosure, the natural graphite is taken as an example of the active material of the negative electrode.

Preparation of Positive Electrode (1) A positive electrode active material (NCM), a conductive agent of acetylene black (SP), and a binder of polyvinylidene fluoride (PVDF) are mixed at a weight ratio of 96:2:2. N-methylpyrrolidone is added as a solvent, and mixed to obtain a positive electrode slurry.

(2) The positive electrode slurry is uniformly coated on an aluminum foil that acts as a current collector, followed by being dried at 85° C., cold-pressed, trimmed, and cut into plates and then into strips, and finally dried at 85° C. under vacuum for 4 hours to obtain a positive electrode.

(3) The inorganic layer is prepared on the surface of at least one electrode active material layer of the above positive electrode, for example, by plasma assisted thermal evaporation deposition, in which the heating source is an electron beam and the heating target is a pure element (such as Al, Si, Mg, etc.) except for oxygen in the inorganic layer. Under the vacuum condition, an oxygen-containing active gas (e.g., oxygen, ozone, oxygen ion, nitrogen monoxide, nitrogen dioxide, carbon dioxide, water vapor, etc.) is used as the reactive gas. The substrate temperature is controlled to be lower than 100° C. By adjusting the heating current (50 A to 300 A), the vacuum degree of process chamber ($10^{-1}$ Pa to $10^{-3}$ Pa), the oxygen volume flow (100 sccm to 2000 sccm), the plasma power (300 W to 600 W) and the processing time, the deposition rate of the inorganic layer on the surface of the positive electrode can be adjusted, and thus the thickness, composition, and micromorphology of the inorganic layer can be further adjusted.

Preparation of Negative Electrode

A negative electrode active material of artificial graphite, a conductive agent of acetylene black, a binder of styrene butadiene rubber (SBR), and a thickener of carboxyl methyl cellulose (CMC) are mixed together at a weight ratio of 96:1:2:1, and deionized water is added therein as a solvent, evenly mixed to obtain a negative electrode slurry. The above negative electrode slurry is uniformly coated on a copper foil that acts as a negative current collector, followed by being dried at 80° C. to 90° C., cold-pressed, trimmed, cut into plates and then into strips, and finally dried at 110° C. under vacuum for 4 hours to obtain a negative electrode.

Preparation of Electrolyte

A basic electrolyte is prepared with dimethyl carbonate (DMC), ethyl methyl carbonate (EMC) and ethylene carbonate (EC) at a mass ratio of 5:2:3. An electrolyte salt is then added therein until the concentration of lithium hexafluorophosphate in the electrolyte is 1 mol/L.

Preparation of Lithium-ion Secondary Battery

The negative electrode, the separator, and the positive electrode are stacked in such a manner that the separator is placed between the positive electrode and the negative electrode, and then wound into a square bare cell having a thickness of 8 mm, a width of 60 mm and a length of 130 mm. The bare cell is packed into an aluminum foil pouch, vacuum-baked at 75° C. under vacuum for 10 hours, filled with non-aqueous electrolyte, and stood for 24 hours after being vacuum-sealed. Then, the battery is charged to a voltage of 3.75V with a constant current of 0.05C, followed by being charged with a current of 0.3C to a constant voltage of 4.2V until the current fell to 0.05C, then the battery is discharged to a voltage of 2.8V with a constant current of 0.3C, and finally charged with a constant current of 1C to a voltage of 3.8V, so as to finish the preparation of the lithium-ion secondary battery.

rial layer. Due to the process limitations, the minimum thickness of coating that can be achieved is only 2000 nm, i.e., the positive electrode D6 is obtained.

TABLE 1

| | Positive Electrode Active Material Layer | | | Inorganic Layer | | | | |
|---|---|---|---|---|---|---|---|---|
| No. | Active Material | Compaction Density g/cm$^3$ | Porosity % | Material | Thickness nm | Porosity % | Average Pore Diameter nm | Mass per Unit Area of The Inorganic Layer g/m$^2$ |
| S1 | NCM811 | 3.5 | 20 | Aluminum oxide | 20 | 20 | 3.3 | 0.08 |
| S2 | NCM811 | 3.5 | 20 | Aluminum oxide | 50 | 30 | 10.2 | 0.18 |
| S3 | NCM811 | 3.5 | 20 | Aluminum oxide | 100 | 30 | 28.4 | 0.35 |
| S4 | NCM811 | 3.5 | 20 | Aluminum oxide | 250 | 30 | 43.1 | 0.88 |
| S5 | NCM811 | 3.5 | 20 | Aluminum oxide | 500 | 30 | 50.7 | 1.26 |
| S6 | NCM811 | 3.5 | 20 | Silicon oxide | 1000 | 30 | 61.5 | 2.52 |
| S7 | NCM811 | 3.5 | 20 | Aluminum oxide/Silicon oxide composite | 1650 | 30 | 72.4 | 4.16 |
| S8 | NCM811 | 3.5 | 20 | AlO(OH) | 2000 | 30 | 80.2 | 5.04 |
| S9 | NCM811 | 3.5 | 20 | Silicon oxide | 500 | 10 | 62.3 | 2.07 |
| S10 | NCM811 | 3.5 | 20 | Silicon oxide | 500 | 40 | 57.4 | 0.92 |
| S11 | NCM811 | 3.5 | 20 | Silicon oxide | 500 | 50 | 43.2 | 0.65 |
| S12 | NCM811 | 3.5 | 20 | Silicon oxide | 500 | 60 | 37.1 | 0.41 |
| S13 | NCM811 | 3.5 | 10 | Aluminum oxide | 500 | 20 | 60.2 | 1.65 |
| S14 | NCM811 | 3.5 | 40 | Aluminum oxide | 500 | 20 | 62.3 | 1.62 |
| S15 | NCM811 | 3.5 | 5 | Aluminum oxide | 500 | 20 | 58.3 | 1.70 |
| S16 | NCM811 | 3.5 | 45 | Aluminum oxide | 500 | 20 | 64.9 | 1.64 |
| S17 | NCM811 | 3.5 | 20 | Aluminum oxide | 500 | 60 | 60.8 | 0.84 |
| D1 | NCM811 | 3.5 | 20 | / | / | / | / | / |
| D2 | NCM811 | 3.5 | 20 | Aluminum oxide | 10 | 30 | 3.2 | 0.04 |
| D3 | NCM811 | 3.5 | 20 | Aluminum oxide | 2250 | 30 | 86.2 | 5.67 |
| D4 | NCM811 | 3.5 | 20 | Silicon oxide | 500 | 5 | 67.8 | 2.32 |
| D5 | NCM811 | 3.5 | 20 | Silicon oxide | 500 | 65 | 35.7 | 0.32 |
| D6 | NCM811 | 3.5 | 20 | Aluminum oxide + Binder | 2000 | 60 | 500 | 5.46 |

In Table 1, "/" indicates that the structure or the parameter is non-existent.

Embodiments

The lithium secondary batteries are prepared by the above method, the inorganic layers having different thicknesses and porosities are deposited on the positive electrode active material layers of the positive electrode by the above vapor deposition method.

The specific process parameters are as follows: the target material is aluminum metal, the vacuum degree of the deposition chamber is lower than 1×10$^{-3}$ Pa, the heating evaporation current is 190 A when the target material is Al, the oxygen volume flow is 300 sccm, the plasma power is approximately 300 W, and the processing time is 5 min.

The specific parameters of the obtained positive electrode are shown in Table 1.

Aluminum oxide powder and the binder of polyvinylidene fluoride (binder content of 50%) are mixed and coated on the surface of the positive electrode active mate- Finally, the measurement procedures and measurement results with respect to the lithium-ion secondary batteries are described below.

(1) Test for Capacitance of Lithium-Ion Secondary Battery

In an incubator with a constant temperature of 25° C., the battery was charged with a constant current of 1C to reach a voltage of 4.2V, and the charge was kept at voltage of 4.2 V until the current fell to 0.05C. Then, the battery was discharged with a constant current of 1C to reach a voltage of 2.8V. The obtained discharge capacitance was the capacitance of the battery.

(2) Test for Capacity Retention Rate of Cycling at High Temperature of Lithium-Ion Secondary Battery Under High Cut-Off Voltage In an incubator with a constant temperature of 60° C., the battery was charged with a constant current of 1C to reach a voltage of 4.3V, and then the charge was kept at voltage of 4.3V until a current was dropped to 0.05C. Then, the battery was discharged with a constant current of 1C to reach a voltage of 2.8V. The obtained discharge capacity was a battery capacity C1 of the first cycle. This charge-discharge cycle was repeated 1000 times to obtain a battery capacity Cn of the $1000^{th}$ cycle.

The capacity retention rate of the $1000^{th}$ cycle=Cn/C1×100%.

(3) Test for High Temperature Storage and Gas Generation Under High Cut-Off Voltage Five batteries were selected respectively from the batteries with positive electrode S1 and D1, and charged to a voltage higher than 4.3 V with a constant current of 0.3C at a room temperature and further charged at a constant voltage of 4.3 V until the current fell to 0.05C so that the batteries were kept in a full charge state of 4.3 V. An internal pressure of each of the full-charged batteries was measured and recorded as $P_0$ before the storage. The batteries then were placed in an oven at 80° C. for 15 days and then taken out. After the batteries were cooled for 1 h, the internal pressure of each of the full-charged batteries was recorded as $P_n$ According to a formula: $\Delta P = P_n - P_0$, a pressure change value before and after the storage of the batteries can be calculated.

The obtained experimental results are shown in Table 2:

TABLE 2

| No. | Capacity (mAh) | Capacity Retention Rate after Cycles of High Temperature (%) | Gas Production after High Temperature Storage (MPa) |
|---|---|---|---|
| S1 | 2104.2 | 90.2 | 0.37 |
| S2 | 2099.9 | 92.9 | 0.31 |
| S3 | 2118.4 | 94.6 | 0.29 |
| S4 | 2081.3 | 95.5 | 0.13 |
| S5 | 2070.5 | 95.1 | 0.15 |
| S6 | 2072.9 | 94.9 | 0.14 |
| S7 | 2083.1 | 94.7 | 0.12 |
| S8 | 1962.1 | 91.1 | 0.15 |
| S9 | 2063.8 | 92.3 | 0.11 |
| S10 | 2098.0 | 95.9 | 0.17 |
| S11 | 2062.4 | 94.6 | 0.24 |
| S12 | 2102.9 | 91.9 | 0.27 |
| S13 | 2008.1 | 93.6 | 0.12 |
| S14 | 2053.2 | 91.3 | 0.14 |
| S15 | 1964.4 | 91.7 | 0.26 |
| S16 | 2073.2 | 92.7 | 0.17 |
| S17 | 2069.4 | 90.7 | 0.28 |
| D1 | 2048.7 | 84.3 | 0.54 |
| D2 | 2093.3 | 87.1 | 0.35 |
| D3 | 1831.7 | 85.5 | 0.31 |
| D4 | 2087.7 | 88.6 | 0.27 |
| D5 | 2008.1 | 89.2 | 0.12 |
| D6 | 2070.5 | 83.6 | 0.29 |

It can be seen from the experimental results of the above embodiments that, the high temperature cycle performance and high temperature storage performance of the lithium-ion battery can be significantly enhanced by providing the inorganic layer containing no binder and having a specific thickness and a specific porosity on the positive electrode active material layer. When the thickness of the inorganic layer is too great or too small, or the porosity of the inorganic layer is too large or too small, the effect of improving the high temperature cycle performance and the high temperature storage performance is limited or even deteriorated.

The present application is disclosed in preferred embodiments as above description. However, these preferred embodiments are not intended to limit the Claims. Any skilled in the art may make changes and modifications without departing from the concept of the present disclosure. The protection scope of the present disclosure shall be based on the scope defined by the Claims.

What is claimed is:

1. A positive electrode comprising
a current collector;
a positive electrode active material layer arranged on at least one surface of the current collector, wherein the positive electrode active material layer contains positive electrode active material particles; and
an inorganic layer having a thickness of 250 nm to 1650 nm arranged on a surface of at least one positive electrode active material layer containing positive electrode active material particles away from the current collector, wherein the inorganic layer is a porous dielectric layer containing no binder, and the inorganic layer has a porosity of 30%~40%,
wherein the porosity of the inorganic layer is higher than a porosity of the positive electrode active material layer,
wherein the inorganic layer has a mass per unit area in a range from 0.41 $g/m^2$ to 5.04 $g/m^2$,
wherein the inorganic layer further contains a material selected from a group consisting of aluminum oxide, AlO(OH), aluminum nitride, aluminum fluoride, silicon oxide, silicon nitride, silicon fluoride, titanium oxide, titanium nitride, titanium fluoride, zinc oxide, zinc nitride, zinc fluoride, magnesium oxide, magnesium nitride, magnesium fluoride, zirconium oxide, zirconium nitride, zirconium fluoride, calcium oxide, calcium nitride, calcium fluoride, barium oxide, barium nitride, barium fluoride, or combinations thereof, and
wherein the positive electrode active material is selected from a group consisting of $Li_zCo_{1-(x+y)}Ni_xMn_yO_2$, $LiCoO_2$, $LiNiO_2$, $LiCo_aNi_{1-a}O_2$, $LiVPO_4$, $Li_2MnO_3$, $LiMn_{2-b}M_bO_4$, $LiFe_cMn_{1-c}PO_4$, or combinations thereof, wherein $0<x<1$, $0<y<1$, $0.9<z<1.2$, $0<a<1$, $0 \leq b<2$, $0<c \leq 1$ and M is selected from a group consisting of Li, Al, Mg, Zn, Cr, La, Nd, Ti, Sn, V, or combinations thereof.

2. The positive electrode according to claim 1, wherein the inorganic layer is prepared by vapor deposition method, the vapor deposition method comprising at least one of atomic layer deposition, chemical vapor deposition, physical vapor deposition or thermal evaporation deposition.

3. The positive electrode according to claim 1, wherein the inorganic layer is disposed on the surface of the positive electrode active material layer and inner walls of pores on the surface of the positive electrode active material layer.

4. The positive electrode according to claim 1, wherein the inorganic layer has a porous structure formed by stacked nanoclusters, and pores for ion transmission formed between the nanoclusters have an average pore diameter in a range from 0.1 nm to 100 nm.

5. The positive electrode according to claim 1, wherein particles of the positive electrode active material are provided with a coating layer, and the coating layer contains at least one of $Al_2O_3$, CaO, $SiO_2$, $TiO_2$, $B_2O_3$, MgO, $ZrO_2$ or lithium transition metal phosphates.

6. The positive electrode according to claim 1, wherein the thickness of the inorganic layer is in a range of 250 nm to 1000 nm.

7. The positive electrode according to claim 1, wherein the thickness of the inorganic layer is in a range of 250 nm to 500 nm.

8. The positive electrode according to claim 3, wherein a ratio of a depth of the inorganic layer in the pores of the positive electrode active material layer to a thickness of the positive electrode active material layer is in a range from 1/1000 to 1/10.

9. The positive electrode according to claim 4, wherein the nanoclusters have an average particle size in a range from 2 nm to 500 nm.

10. The positive electrode according to claim 5, wherein the coating layer has a thickness in a range from 5 nm to 500 nm.

11. An electrochemical device, comprising a positive electrode, a negative electrode, a separator and an electrolyte, wherein the positive electrode is the positive electrode according to claim 1.

12. The electrochemical device according to claim 11, wherein the electrochemical device is a lithium-ion secondary battery, and the thickness of the inorganic layer has no change when the lithium-ion secondary battery reaches a voltage of at least 5 V.

13. A method for preparing the positive electrode according to claim 1, comprising at least following steps:
preparing a slurry by mixing positive electrode active material particles, a binder and a conductive agent;
coating on at least one surface of a current collector with the slurry and drying the slurry to form a positive electrode active material layer containing positive electrode active material particles; and
preparing an inorganic layer having a thickness of 250 nm to 1650 nm on a surface of at least one positive electrode active material layer containing positive electrode active material particles away from the current collector by vapor deposition method, wherein the inorganic layer is a porous dielectric layer containing no binder, and the inorganic layer has a porosity of 30%~40%,
wherein the porosity of the inorganic layer is higher than a porosity of the positive electrode active material layer,
wherein the inorganic layer has a mass per unit area in a range from 0.41 $g/m^2$ to 5.04 $g/m^2$,
wherein the inorganic layer further contains a material selected from a group consisting of aluminum oxide, AlO(OH), aluminum nitride, aluminum fluoride, silicon oxide, silicon nitride, silicon fluoride, titanium oxide, titanium nitride, titanium fluoride, zinc oxide, zinc nitride, zinc fluoride, magnesium oxide, magnesium nitride, magnesium fluoride, zirconium oxide, zirconium nitride, zirconium fluoride, calcium oxide, calcium nitride, calcium fluoride, barium oxide, barium nitride, barium fluoride, or combinations thereof, and
wherein the positive electrode active material is selected from a group consisting of $Li_zCo_{1-(x+y)}Ni_xMn_yO_2$, $LiCoO_2$, $LiNiO_2$, $LiCo_aNi_{1-a}O_2$, $LiVPO_4$, $Li_2MnO_3$, $LiMn_{2-b}M_bO_4$, $LiFe_cMn_{1-c}PO_4$, or combinations thereof, wherein $0<x<1$, $0<y<1$, $0.9<z<1.2$, $0<a<1$, $0≤b<2$, $0<c≤1$, and M is selected from a group consisting of Li, Al, Mg, Zn, Cr, La, Nd, Ti, Sn, V, or combinations thereof.

14. The method for preparing a positive electrode according to claim 13, wherein the vapor deposition method comprises at least one of atomic layer deposition, chemical vapor deposition, physical vapor deposition, or thermal evaporation deposition.

\* \* \* \* \*